July 8, 1958 H. ZELLNER 2,842,485
APPARATUS FOR BIDISTILLATION
Filed Sept. 29, 1953 3 Sheets-Sheet 1

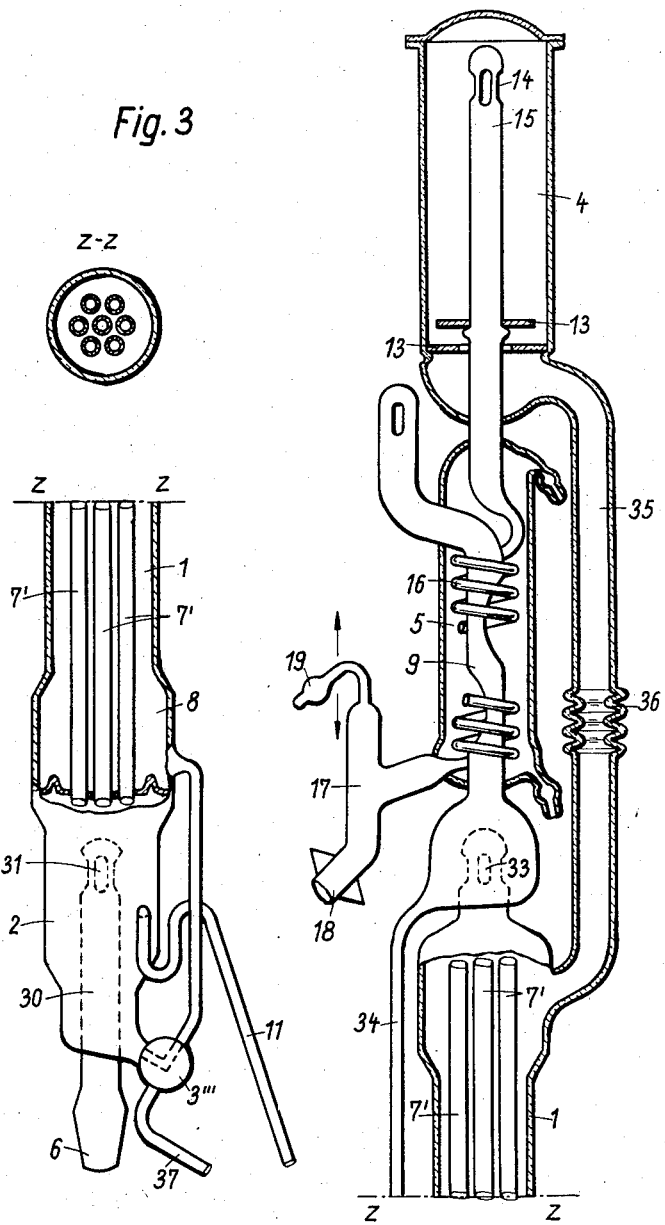

United States Patent Office 2,842,485
Patented July 8, 1958

2,842,485
APPARATUS FOR BIDISTILLATION

Hugo Zellner, Linz, Austria, assignor to Jenaer Glaswerk Schott & Gen., Mainz, Rhineland-Pfalz, Germany Application September 29, 1953, Serial No. 382,924

Claims priority, application Austria October 2, 1952

4 Claims. (Cl. 202—174)

The invention relates to an energy saving process for bidistillation of a homogeneous liquid to be purified. An object of the invention is a process in which through heat exchange between the primary vapor and the monodistillate, which is placed under diminished pressure, the monodistillate is heated again and vaporized to secondary vapor.

Figure 1:
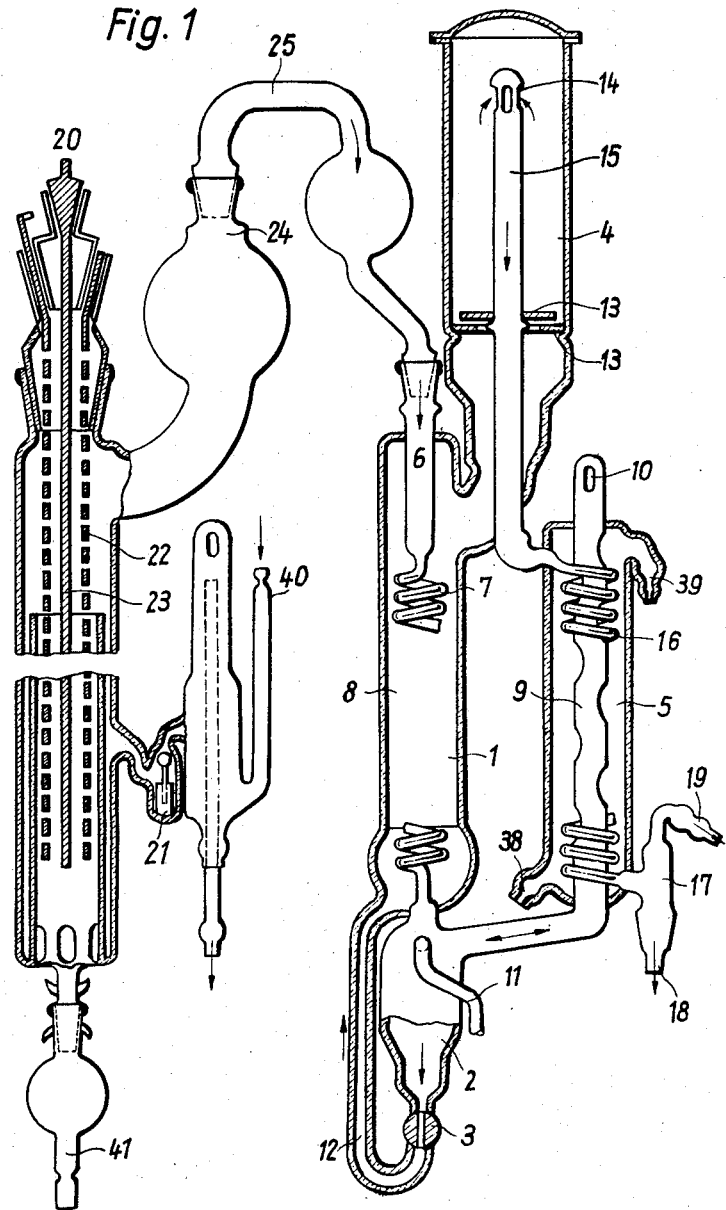
Figures 1A, 1B, 2:
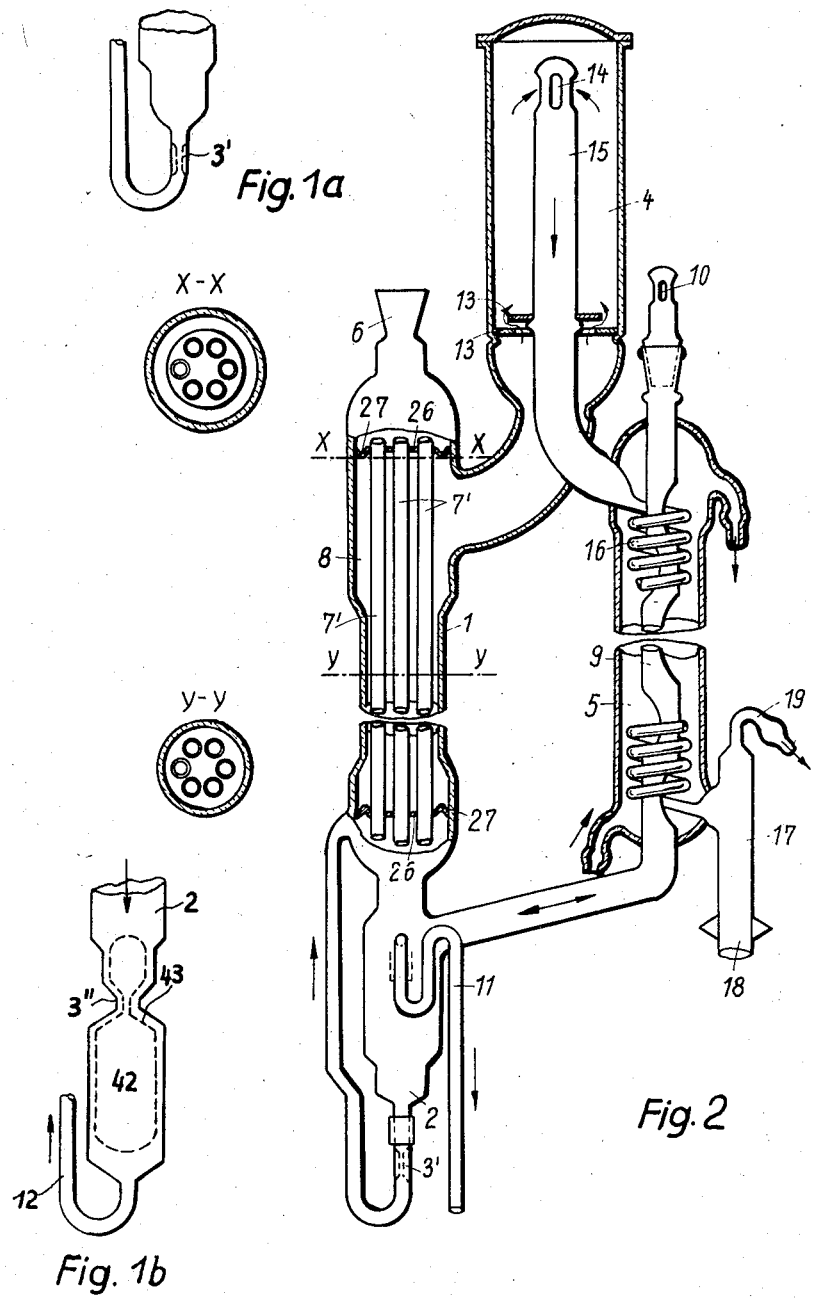

Further features and advantages of the invention will appear more clearly from the following description in connection with the attached drawings, giving diagrammatic sectional elevation views of preferred embodiments of said invention:

Fig. 1 shows in diagrammatic section an execution form in accordance with the invention of the double still in conjunction with an evaporator familiar as such and a level regulator for this evaporator. Fig. 1a shows a capillary tube which may be employed in the apparatus shown in Fig. 1 instead of the slit cock 3. In Fig. 1b is shown a level regulator with a float valve which may also be employed instead of said slit cock 3 of Fig. 1. Figs. 2 and 3 represent further execution examples of the invention, whereby the two parts drawn side by side in Fig. 3 for considerations of space are to be thought of as over one another and thereby yielding an especially space saving construction.

The represented apparatuses consist in their principal parts of a heat exchanger 1, an intermediate vessel 2 for the monodistillate with reflux cooler and overflow, a transition regulator 3 forming a throttle for reducing normal pressure to vacuum, a vapor steadying vessel 4 annexed to the heat exchanger 1, and a cooler 5 to which can be connected a receiving vessel for the double distillate.

In the apparatus represented in Fig. 1, the vapor is derived from an evaporator 20 familiar as such with concentric electrodes (cf. Austrian Patent 169,752) or from some other source of steam. The vapor flows at 6 into the tubular spiral 7 of a heat exchanger 1, at whose lower end is joined a receiving vessel 2 for the monodistillate. Since in starting the apparatus the heat transmission from the spiral 7 is still very slight, a mixture of primary vapor and condensed water flows into vessel 2. The vapor constituent arrives in the inner tube 9, open above at 10, of a cooler 5, in which it is condensed. The resulting condensate flows back and collects in vessel 2. At the lower end of vessel 2 is arranged a slit cock 3 with precision adjustment, or, in accordance with Fig. 1a, a capillary tube 3' forming a throttle for reducing pressure. As Fig. 1b shows, there can also be provided at this place a level regulator 3" with a float valve also forming a pressure-reducing throttle. The float consists for example of a hollow glass body 42 with a sealing cone 43 which interacts with a conical countersurface on vessel 2. The pressure reduction achieved hereby depends on the upward thrust of the float. A pipe line 12 is provided behind the cock 3 or as the case may be behind the capillary 3', or the level regulator 3", which leads into the mantle space 8 of the heat exchanger 1. The heat exchanger 1 is connected with a steadying vessel 4, from which a pipe line 15 leads to the tubular spiral 16 of the cooler 5. At the end of the tubular spiral 16 is provided the discharge 17 for the bidistillate, which also is equipped with an attached nipple 19 for connecting a vacuum pump.

The vacuum pump connected to the nipple 19 draws the monodistillate through the cock 3 or the capillary 3' or the level regulator 3" into the mantle space 8 of the heat exchanger 1. Since the distillate is under diminished pressure it is brought to renewed boiling through the heat loss of the primary vapor, which flows through the tubular spiral 7. The vapor generated in the vacuum flows through the baffles 13 of the steadying vessel 4. Below said baffles 13, Raschig rings are mounted for the purpose of checking the flow, whereby finest water droplets carried along are precipitated. The thus purified vapor arrives through the opening 14 of the inner tube 15 of the steadying vessel 4 into the tubular spiral 16 of the cooler 5 and there is cooled and condensed by the cooling liquid flowing through the outer mantle of the cooler. The bidistillate flows through the suction part 17 by way of the nipple 18 into a receiver, which to reduce breakage danger is appropriately joined to nipple 18 with a ground ball-and-socket joint.

In practice it has developed, that immediately after putting the described double distillation apparatus in action, a stable condition of equilibrium develops under certain conditions. For that it only is necessary that the primary vapor generator 20 is equipped with a level regulator 21, which regulates the amount of vapor developed.

For further elucidation of these conditions there is also represented in Fig. 1 an evaporator 20, which is equipped with concentric electrodes 22, 23. The liquid level in the evaporator is so adjusted with a level regulator, familiar as such, that the vapor pressure at the exit of the evaporator remains essentially constant. The generated vapor is conducted with aid of an elbow 25 attached to the evaporator at 24 to the entrance 6 of the heat exchanger 1. The liquid level in the evaporator 20 now always adjusts itself to the dynamic pressure of the vapor in tubular spiral 7 dependent on the heat loss in heat exchanger 1, because the liquid by means of the level regulator 21 is prevented from flowing against the effective interior pressure beyond a definite level. Thereby the system, primary evaporator-heat exchanger, is stabilized. If for example the heat loss in the evaporator 1 is great, then much primary vapor is condensed, therefore the vapor pressure decreases, the level regulator 21 supplies more liquid and the amount of vapor increases correspondingly. If on the other hand the heat loss in the heat exchanger 1 is small, then the flow resistance of the vapor in spiral 7 increases and the liquid level in the primary evaporator sinks correspondingly.

On the other hand the heat loss from spiral 7 of the heat exchanger 1 depends on the adjustment of cock 3 or the diameter of the capillary 3' according to Fig. 1b or on the liquid counterpressure on the float 42 according to Fig. 1b, since hereby is determined the amount of the monodistillate drawn into the mantle space 8 of the heat exchanger 1. Further, the effectivity of the cooler 5 is also determinative for the heat loss of the tubular spiral 7, since through this the tension of the secondary vapor is determined corresponding to the temperature of the bidistillate running off at 18. With high effectivity of the cooler 5 the vapor pressure in the system adjusts itself to the surrounding temperature, since the receiving vessel below the nipple 18 is at the surrounding temperature. In this case the maximum attainable vacuum is obtained. Also essential for stable operation of the second evaporating system is the retarding of the vapor flow which is effected by the baffles 13 and the Raschig rings placed below them, resting on the tapering part of the stabilizing vessel. With correct adjustment of the reduced pressure the amount of the water drawn in through the cock 3 or capillary 3' remains constant, and therewith the heat loss in the heat exchanger 1 is also kept constant, so that the entire system operates stably. Thereby the adjustment of the cock 3 or the diameter of the capillary 3' is not critical. If the passage through the cock 3 or the capillary 3' is too small, so that a residual vapor is condensed in reflux condenser 9, then the excess water can flow off through a siphon tube applied to vessel 2.

The execution example of the invention represented in Fig. 2 agrees in essentials with the execution example according to Fig. 1, only that in place of a heat exchanger with a tubular spiral, one with a bundle of tubes is employed. In this case the heat exchanger 1 consists of a glass tube 8 constricted in its middle section, in whose inner space are mounted several narrower tubes 7' directed parallel to the axis. For taking up heat expansions, the bundle of tubes 7' is fused above and below into a glass plate 26, which is provided with a suitably deepened circular groove, wave shaped in cross section, and fused to the outer mantle. The circular groove makes possible relative expansions of the bundle of tubes 7' over against the outer mantle. The glass tube 7' can be made parallel walled, however a construction tapering below is to be preferred, because hereby the diameter of the tube becomes smaller corresponding to the diminution of the still present uncondensed amount of vapor, and through that the heat exchange becomes better.

The execution form of the invention represented in Fig. 3 has the constructive advantage, that the total apparatus is arranged on an axis and thus can more easily be mounted in a laboratory manner and besides is in less danger of breakage. Hereby the primary vapor enters the apparatus from below at 6 from an evaporator with variable level. It flows through the lateral openings 31 of the inner tube 30 and then arrives in the inner tube 7' of the heat exchanger 1, where with normal operation of the apparatus it is condensed.

The condensation water collects in vessel 2. In starting the apparatus the primary vapor passes uncondensed through the heat exchanger 1 and flows out through the opening 33 at the upper end of the same, from where it arrives in the inner tube 9 of the cooler 5, refluxing through the tube 34 into the vessel 2, condensed.

The receiving vessel 2 for the monodistillate is equipped, for withdrawal of eventually present excess distillate especially with use of an unregulated primary vapor generator, with a U-shaped bent siphon tube 11, through which excess monodistillate can be drawn off. Besides, vessel 2 is provided with a slit angle cock 3'''. In the delineated position of this cock the monodistillate, as soon as a vacuum pump at 19 is put in operation, is drawn into the outer mantle 8 of the heat exchanger 1. Through the heat loss of the primary vapor from the bundle of tubes 7' the water begins to boil anew. The secondary vapor enters the vacuum through tube 35, which for reducing the glass tensions is provided with an expansion bellows joint 36, and enters through baffles 13 the steadying vessel 4 and arrives from there, in the manner already elucidated at hand of Fig. 1, through the cooler 5 into the outlet 17.

The same apparatus can also be used for obtaining monodistillate. For this it is only necessary to so turn the angle cock 3''' of vessel 2, that vessel 2 instead of the heat exchanger is connected with a discharge tube 37. Hereby the primary vapor flows uncondensed through the heat exchanger 1 and is in toto first condensed in the reflux cooler 5, 9.

As vacuum pump within the frame of the invention it is suitable to employ a liquid jet pump, whose liquid after passage through the pump is to a great extent freed from entrapped air by splashing into a large vessel. From there the liquid in accordance with Fig. 1 at 38 enters the cooler 5, which it leaves preheated at 39. The preheated liquid at 40 is introduced into the evaporator 20 across the level regulator 21. Contaminations are separated in the evaporator 20 at 41.

For laboratory purposes and for utilization in pharmaceutical and similar industries, the described apparatus is made of glass, quartz, silver, or of silver plated or tinned copper. Without difficulty the purity of water is brought to a limiting concentration, which is determined by the solubility of ions discharged from the glass. Therefore, in one operation "conductivity water" can be produced from ordinary tap water. This is also possible if the water is chlorinated, whereas with simple distillation with normal pressure the required absence of free chlorine cannot be obtained in the latter case.

An essential saving of energy results through utilization of the latent heat of the primary vapor for production of the secondary vapor and the appropriate preheating in the frame of the invention of the liquid to be distilled through use of the same as a cooling liquid for production of the bidistillate. Thereby it is especially to be noted that the primary distillate is not extensively cooled, but assumes a temperature of only about 80 to 90° C. in the receiving vessels 2. For this reason the primary distillate contains from the outset only slight amounts of gas in solution, since the gases are less soluble in hot water than in cold. The stay of the water in receiving vessel 2 is only brief and does not suffice for complete reestablishment of the equilibrium with the surrounding gas pressure. Through the sudden passage of the water into the vacuum through the throttling device 3, the water is extensively degassed. The gas is continuously discharged into the vacuum, whereby through the continuous work of the vacuum pump large amounts of gas can also be drawn off. If the water were completely free of gas further pumping would not be required after once establishing the vacuum, since the amount of the water evaporated in the heat exchanger is equal to the amount of water condensed in the cooler. Therefore during operation of the apparatus the entire pumping performance is available for carrying away the gases. A redissolving of the gases in the end condensate is prevented by the separation of suction point 19 and discharge nipple 18. The length of stay of the condensate in the cooler does not suffice by far for re-establishment of the solution equilibrium. Moreover, through distillation in vacuum the solution equilibrium from the beginning is largely displaced to the disfavor of the dissolved gases.

For the explained reasons the bidistilled water, or other bidistilled liquids, obtained in accordance with the invention, contain only very small amounts of dissolved gases. For the production of an air-free distillate it is only necessary to let the primary vapor run under an inert gas as e. g. hydrogen or nitrogen. To be sure then the pumping liquid cannot be used for feeding the evaporator. In this case the bidistillate contains only the smallest amounts of the employed inert gas.

I claim:

1. An apparatus for bidistillation of a liquid containing non-volatile impurities consisting of a primary vaporizer, a heat exchanger which is composed of a spiral tube surrounded by a mantle, this mantle forming a secondary vaporizing space between itself and the spiral tube, the upper end of the spiral tube being connected to said primary vaporizer, a vessel for receiving the monodistillate whereby the inlet opening of this vessel is connected to the lower end of said spiral tube, a throttle valve which is arranged within a pipe, this pipe connecting the outlet of said vessel to the lower end of said secondary vaporizing space in which the monodistillate is vaporized completely to secondary vapor by heat exchange with the primary vapor, a steadying vessel connected to the upper end of said secondary vaporizing room, a condenser for condensing the secondary vapor with its upper end connected to the outlet of the steadying vessel, a vacuum pump and a vessel for receiving the bidistillate, both connected to the lower end of said condenser.

2. An apparatus for bidistillation of a liquid containing non-volatile impurities consisting of a primary vaporizer, a heat exchanger which is composed of a bundle of tubes whereby the cross section of each tube decreases from the upper to the lower end, and a mantle surrounding said bundle of tubes such forming a secondary vaporizing space between itself and the tubes, the upper end of the bundle of tubes being connected to said primary vaporizer, a vessel for receiving the monodistillate whereby the inlet opening of this vessel is connected to the lower end of said bundle of tubes, a throttle valve which is arranged within a pipe, this pipe connecting the outlet of said vessel to the lower end of said secondary vaporizing space in which the monodistillate is vaporized completely to secondary vapor by heat exchange with the primary vapor, a steadying vessel connected to the upper end of said vaporizing room, a condenser for condensing the secondary vapor with its upper end connected to the outlet of the steadying vessel, a vacuum pump and a vessel for receiving the bidistillate, both connected to the lower end of said condenser.

3. An apparatus for bidistillation of a liquid containing non-volatile impurities consisting of a primary vaporizer, a heat exchanger which is composed of a spiral tube surrounded by a mantle, this mantle forming a secondary vaporizing space between itself and the spiral tube, the upper end of the spiral tube being connected to said primary vaporizer, a vessel for receiving the monodistillate whereby the inlet opening of this vessel is connected to the lower end of said spiral tube, a throttle valve which is arranged within a pipe, this pipe connecting the outlet of said vessel to the lower end of said secondary vaporizing space in which the monodistillate is vaporized completely to secondary vapor by heat exchange with the primary vapor, a steadying vessel connected to the upper end of said secondary vaporizing room, a condenser which is composed of a spiral tube surrounded by a mantle whereby the cooling liquid flows through this mantle and the outlet of the mantle is connected by a pipe with the inlet opening of said primary vaporizer, the upper end of the spiral tube of said condenser being connected to the outlet of the steadying vessel, a vacuum pump and a vessel for receiving the bidistillate, both connected to the lower end of the spiral tube of said condenser.

4. An apparatus as in claim 1 in which said throttle valve has the shape of a float valve which holds constant the amount of monodistillate drawn in said secondary vaporizing room irrespective of the amount of the vacuum in that room.

References Cited in the file of this patent

UNITED STATES PATENTS

| | | |
|---|---|---|
| 103,604 | Gutzkow | May 31, 1870 |
| 120,701 | Booze | Nov. 7, 1871 |
| 742,697 | Martin | Oct. 27, 1903 |
| 898,980 | Lowenstein | Sept. 15, 1908 |
| 992,814 | Shuman | May 23, 1911 |
| 1,089,417 | Klar | Mar. 10, 1914 |
| 1,468,899 | Chenard | Sept. 25, 1923 |
| 2,126,974 | Reich | Aug. 16, 1938 |
| 2,159,303 | Waterman et al. | May 23, 1939 |

FOREIGN PATENTS

| | | |
|---|---|---|
| 17,090 | Switzerland | Nov. 8, 1898 |
| 55,746 | Switzerland | Mar. 27, 1911 |
| 82,428 | Switzerland | Apr. 15, 1919 |